United States Patent
Kim (10) Patent No.: US 9,817,443 B2
(45) Date of Patent: Nov. 14, 2017

(54) DISPLAY APPARATUS

(71) Applicant: Samsung Electronics Co., Ltd., Suwon-si, Gyeonggi-do (KR)

(72) Inventor: Yu-su Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 141 days.

(21) Appl. No.: 14/981,020

(22) Filed: Dec. 28, 2015

(65) Prior Publication Data
US 2017/0031387 A1 Feb. 2, 2017

(30) Foreign Application Priority Data
Jul. 31, 2015 (KR) .................. 10-2015-0108936

(51) Int. Cl.
*G06F 1/16* (2006.01)
(52) U.S. Cl.
CPC .................. *G06F 1/1652* (2013.01)
(58) Field of Classification Search
None
See application file for complete search history.

(56) References Cited

U.S. PATENT DOCUMENTS

| | | | |
|---|---|---|---|
| 7,497,784 B2 | 3/2009 | Henry | |
| 7,639,237 B2 * | 12/2009 | Perkins | G06F 1/1615 |
| | | | 345/156 |
| 7,710,370 B2 | 5/2010 | Slikkerveer et al. | |
| 8,001,711 B2 | 8/2011 | Lafarre et al. | |
| 8,067,802 B2 | 11/2011 | Dekker et al. | |
| 8,199,471 B2 | 6/2012 | Bemelmans et al. | |
| 8,353,598 B2 | 1/2013 | Estevez et al. | |
| 8,358,275 B2 | 1/2013 | Huitema | |
| 8,446,549 B2 | 5/2013 | Huitema et al. | |
| 8,477,250 B2 | 7/2013 | Schellingerhout et al. | |
| 8,605,421 B2 | 12/2013 | Verschoor et al. | |
| 8,711,566 B2 * | 4/2014 | O'Brien | G06F 1/1624 |
| | | | 361/724 |
| 8,830,577 B2 | 9/2014 | Hajjar | |
| 9,223,348 B2 * | 12/2015 | Cho | G06F 3/04886 |

(Continued)

FOREIGN PATENT DOCUMENTS

EP    1 565 900 B1    4/2013
JP    2011-176513 A   9/2011

(Continued)

*Primary Examiner* — Xanthia C Cunningham
(74) *Attorney, Agent, or Firm* — Jefferson IP Law, LLP (57) ABSTRACT

A display apparatus is provided. The display apparatus includes a housing having an opening, a first roll and a second roll rotatably provided within the housing, a display configured to be wound on the first roll, and to be retracted and withdrawn through the opening according to a rotation direction of the first roll, a protection member configured to be wound on the first roll together with the display or to be wound in the second roll as the display is withdrawn from the housing, and a moveable component mounting part which is disposed between the first roll and the second roll and on which various components are mounted within the housing. The component mounting part moves within the housing to selectively provide space and utilize space according to a retraction operation and a withdrawal operation of the display.

18 Claims, 7 Drawing Sheets

(56) References Cited

U.S. PATENT DOCUMENTS

| | | | |
|---|---|---|---|
| 9,625,946 B2* | 4/2017 | Lee | G06F 1/1652 |
| 9,625,948 B2* | 4/2017 | Zhang | G06F 1/1652 |
| 2006/0166713 A1* | 7/2006 | Yeh | G06F 1/1626 |
| | | | 455/575.1 |
| 2006/0176243 A1* | 8/2006 | Yeh | G06F 1/1624 |
| | | | 345/30 |
| 2006/0192726 A1* | 8/2006 | Huitema | G06F 1/1601 |
| | | | 345/1.1 |
| 2008/0013292 A1 | 1/2008 | Slikkerveer et al. | |
| 2009/0231307 A1* | 9/2009 | Lee | G06F 1/1601 |
| | | | 345/184 |
| 2010/0134873 A1* | 6/2010 | van Lieshout | G02F 1/133305 |
| | | | 359/296 |
| 2010/0164973 A1* | 7/2010 | Huitema | G06F 1/1615 |
| | | | 345/581 |
| 2012/0050075 A1* | 3/2012 | Salmon | G06F 1/1626 |
| | | | 341/20 |
| 2012/0204453 A1* | 8/2012 | Jung | G09F 9/301 |
| | | | 40/517 |
| 2012/0212433 A1 | 8/2012 | Lee et al. | |
| 2012/0244910 A1 | 9/2012 | Hsu | |
| 2013/0058063 A1* | 3/2013 | O'Brien | G06F 1/1624 |
| | | | 361/807 |
| 2013/0127799 A1 | 5/2013 | Lee | |
| 2013/0128439 A1* | 5/2013 | Walters | G06F 1/1641 |
| | | | 361/679.04 |
| 2013/0201208 A1* | 8/2013 | Cho | G06F 3/1431 |
| | | | 345/619 |
| 2013/0314762 A1* | 11/2013 | Kwack | G02F 1/09 |
| | | | 359/280 |
| 2013/0335311 A1 | 12/2013 | Kim | |
| 2014/0098034 A1 | 4/2014 | Hack et al. | |
| 2014/0166992 A1 | 6/2014 | Hack et al. | |
| 2014/0194165 A1* | 7/2014 | Hwang | G06F 1/1677 |
| | | | 455/566 |
| 2014/0218375 A1* | 8/2014 | Kim | G06F 3/147 |
| | | | 345/501 |
| 2014/0305180 A1* | 10/2014 | Kim | B21D 11/02 |
| | | | 72/298 |
| 2016/0100478 A1* | 4/2016 | Lee | H04M 1/0202 |
| | | | 361/749 |
| 2016/0135284 A1* | 5/2016 | Choi | G09F 9/301 |
| | | | 361/749 |
| 2016/0163242 A1* | 6/2016 | Lee | G09F 9/301 |
| | | | 40/584 |
| 2016/0320804 A1* | 11/2016 | Takayanagi | G06F 1/1615 |
| 2017/0060183 A1* | 3/2017 | Zhang | G06F 1/1605 |

FOREIGN PATENT DOCUMENTS

| | | |
|---|---|---|
| KR | 10-0540746 B1 | 12/2005 |
| KR | 10-2012-0095019 A | 8/2012 |

* cited by examiner

DISPLAY APPARATUS

CROSS-REFERENCE TO RELATED APPLICATION(S)

This application claims the benefit under 35 U.S.C. §119 (a) of a Korean patent application filed on Jul. 31, 2015 in the Korean Intellectual Property Office and assigned Serial number 10-2015-0108936, the entire disclosure of which is hereby incorporated by reference.

TECHNICAL FIELD

The present disclosure relates to a display apparatus. More particularly, the present disclosure relates to a compact display apparatus with reduced internal space for accommodating both a retractable display and display protection member.

BACKGROUND

In recent years, display apparatuses have become situated as key electronic apparatuses. Electronic apparatuses including the display apparatuses have been increasingly miniaturized, but many customers continue to demand a large-scaled screen.

Accordingly, many display apparatuses such as smart phones and tablet personal computers (PCs) may include a rollable display. The display may be unrolled or unwound, and extended for use in response to the display being used by the user. The display may be rolled or wound, and retracted in response to the completed use of the display by the user.

However, in response to the display being wound and retracted inside the display apparatuses in the related art, a top surface of the display may be in direct contact with a bottom surface thereof, and thus a display panel may be damaged.

In recent years, the display apparatuses may include a protection member on the top surface or the bottom surface of the display, and thus the top surface and the bottom surface of the display may not be in direct contact with each other in response to the display being wound and retracted within the display apparatuses.

In such display apparatuses, the protection member needs to be configured in such a manner that the protection member is separated from the display and kept within the display apparatus so as to smoothly dissipate the heat from the display in a state where the display is spread for use. Accordingly, the display apparatus may require a separate space in which the protection member is to be wound and kept within the display apparatus.

The display apparatus in the related art may include a roll for display accommodation that is configured to allow the display to be wound and kept within the display apparatus, and a roll for protection member accommodation that is configured to allow the protection member to be wound and kept within the display apparatus. The rolls may be provided to be rotatable with respect to fixed rotation shafts.

Since the display apparatus having such a structure has to provide internal space for the display and protection member accommodation in response to the display and protection member being simultaneously wound on the roll for the display accommodation and storage in the display apparatus, and provide internal space for the protection member accommodation in response to only the protection member being wound on the roll for the protection member accommodation and storage in the display apparatus, the size of the display apparatus may be unnecessarily increased.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and provide at least the advantages described below. Accordingly, an aspect of the present disclosure is to provide a compact display apparatus with improved internal space use efficiency.

In accordance with an aspect of the present disclosure, a display apparatus is provided. The display apparatus includes a housing having an opening, a first roll and a second roll rotatably provided within the housing, a display configured to be wound on the first roll, and to be retracted and withdrawn through the opening according to a rotation direction of the first roll, a protection member configured to be wound on the first roll together with the display or to be wound on the second roll, and a component mounting part which is moveably disposed between the first roll and the second roll and on which various components are mounted within the housing. The component mounting part may move within the housing according to a retraction operation and a withdrawal operation of the display.

In accordance with another aspect of the present disclosure, a display apparatus is provided. The display apparatus includes a housing having an opening, a first roll and a second roll rotatably provided within the housing, a display configured to be wound on the first roll, and to be retracted and withdrawn through the opening according to a rotation direction of the first roll, a protection member configured to be wound on the first roll together with the display or to be wound on the second roll, and a component mounting part which is moveably disposed between the first roll and the second roll and on which various components are mounted within the housing. The component mounting part may move to a space which is provided by unrolling the display and the protection member from the first roll or may move to a space which is provided by unrolling the protection member from the second roll.

Other aspects, advantages, and salient features of the disclosure will become apparent to those skilled in the art from the following detailed description, which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

In the following description, unless otherwise described, the same reference numerals are used for the same elements when they are depicted in different drawings. The matters defined in the description, such as detailed construction and elements, are provided to assist in a comprehensive understanding of the various embodiments of the present disclosure. Thus, it is understood that the various embodiments can be carried out without those specifically defined matters. Also, functions or elements known in the related art are not described in detail since they would obscure the various embodiments of the present disclosure with unnecessary detail.

A display apparatus according to an embodiment of the present disclosure, will be described with reference to FIGS. 1 to 3.

Figure 1:
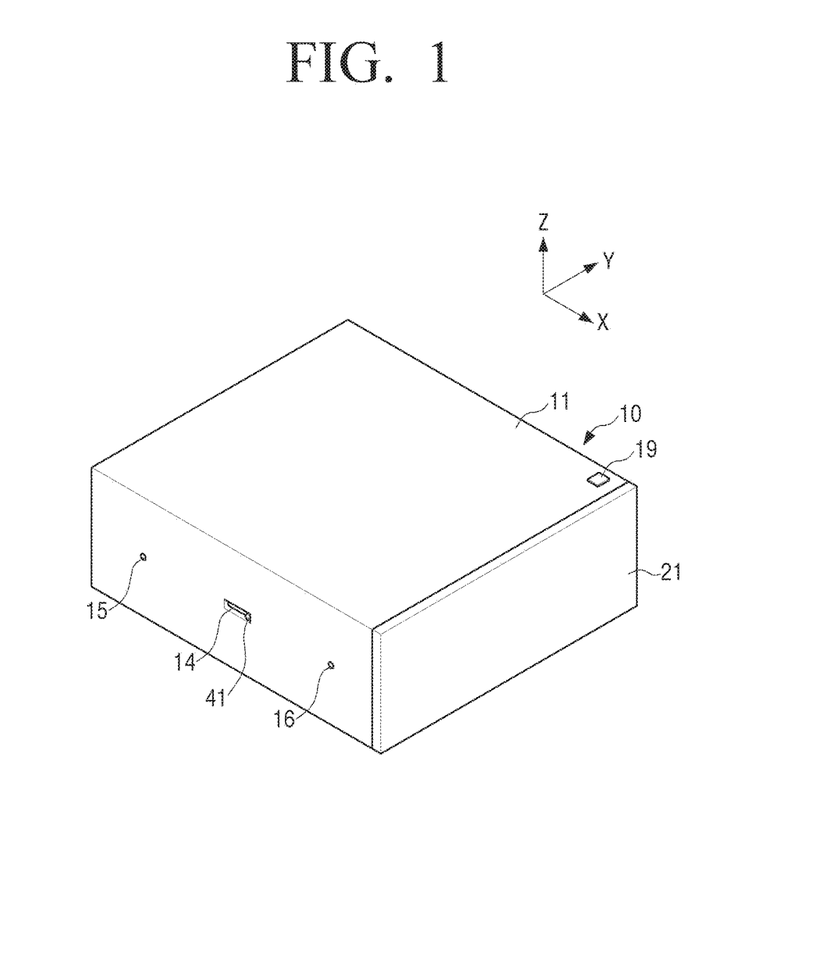
FIG. 1 is a perspective view illustrating a display apparatus according to an embodiment of the present disclosure.

FIG. 1 is a perspective view illustrating a display apparatus according to an embodiment of the present disclosure.

Figure 2:
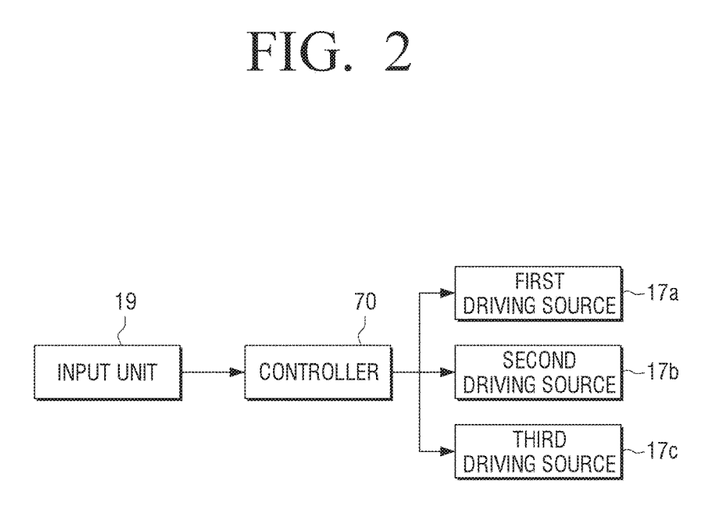
FIG. 2 is a block diagram illustrating a method of controlling a display apparatus of FIG. 1 according to an embodiment of the present disclosure.

FIG. 2 is a block diagram illustrating a method of controlling a display apparatus of FIG. 1 according to an embodiment of the present disclosure.

Figure 3:
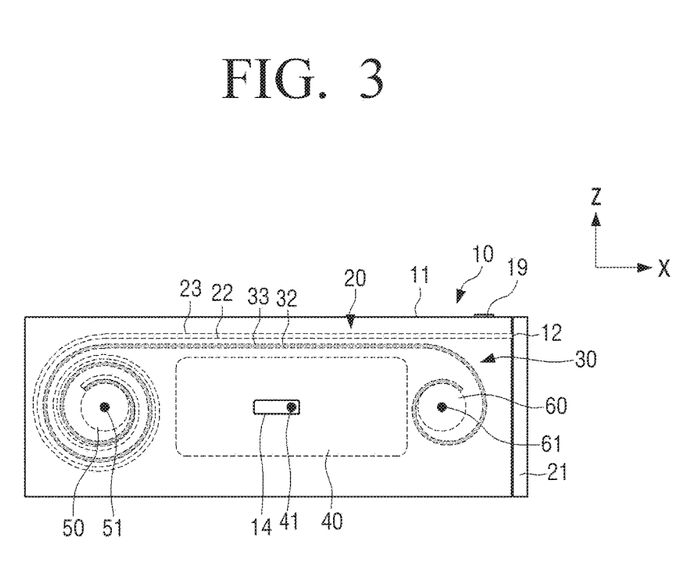
FIG. 3 is a sectional side view illustrating a display apparatus of FIG. 1 according to an embodiment of the present disclosure.

FIG. 3 is a sectional side view illustrating a display apparatus of FIG. 1, according to an embodiment of the present disclosure.

Referring to FIGS. 1 to 3, the display apparatus may include a housing 10, an extendable and retractable display 20, a protection member 30, a moveable component mounting part 40, a first roll 50, a second roll 60, and a controller 70, but embodiments are not limited thereto. The display apparatus according to an embodiment of the present disclosure may have a structure wherein the display 20 may be rolled and kept within the housing 10, and if necessary, the display 20 may be withdrawn from the housing 10 and unrolled to provide information to the user.

The housing 10 may form an outer appearance of the display apparatus, and may be formed of a metal or plastic material. The display 20, the protection member 30, the component mounting part 40, the first roll 50, the second roll 60, and the controller 70 may be provided within the housing 10.

An opening 12 may be provided in one surface or one side of a main case 11 of the housing 10. The display 20 may be unrolled from the first roll 50 and extend outside of the display apparatus through the opening 12, or the display 20 may be wound on the first roll 50 and retracted into and contained within the housing 10 through the opening 12.

The moveable component mounting part 40 may be disposed within the housing 10, between the first roll 50 and the second roll 60. As described in greater detail below, when space becomes available in the housing around the first roll 50 due to withdrawal of the display 20, the component mounting part 40 may be moved toward the first roll 50 thereby providing more space in a periphery of the second roll. When space becomes available in the housing around the second roll 60 due to removal of the protection member 30, the component mounting part 40 may be moved toward the second roll 60 thereby providing more space in a periphery of the first roll. In doing so, an overall size of the housing can be reduced, since the component mounting part 40 is movable to take advantage of each space that becomes available by the alternating expansion and contraction of the first and second roll, and is moveable to provide space that becomes needed by the alternating expansion and contraction of the first and second roll.

A guide hole 14 configured to guide a moving shaft 41 of the component mounting part 40 may be formed in an inner lateral surface of the housing 10. The guide hole 14 may be formed as an elongated hole shape having a preset size so that the moving shaft 41 may be slidably driven a preset distance to move the component mounting part 40 within the housing 10. However, the shape of the guide hole 14 is not limited to the elongated hole formed in the lateral surface of the housing 10, and the guide hole 14 may be a groove formed in the inner lateral surface of the housing 10 to a preset depth and not extend through the lateral surface. The component mounting part 40 may move on a surface parallel to a surface in which the display 20 is withdrawn from the housing 10, but the moving path may be varied according to the arrangement of the first roll 50 and/or the second roll 60.

For example, the guide hole 14 may be formed to extend along an X-axis direction by a preset length, and may guide the moving shaft 41 along the X-axis direction. Accordingly, the component mounting part 40 may move along the X-axis within the housing 10.

The housing 10 may further include a first coupling hole 15 to which a first rotation shaft 51 of the first roll 50 is rotatably coupled and a second coupling hole 16 to which a second rotation shaft 61 of the second roll 60 is rotatably coupled, and which are provided in the inner lateral surface thereof. The first coupling hole 15 and the second coupling hole 16 may be coupled to the first rotation shaft 51 and the second rotation shaft 61 to support the first roll 50 and the second roll 60. The first coupling hole 15 and the second coupling hole 16 may be formed to have the same shapes as cross-sections of the first rotation shaft 51 and the second rotation shaft 61 so that the first rotation shaft 51 and the second rotation shaft 61 may be rotated in a state coupled to the first coupling hole 15 and the second coupling hole 16. For example, the first coupling hole 15 and the second coupling hole 16 may be formed substantially in a circular shape. The shapes of the first and second coupling holes 15 and 16 are not limited to the holes formed in the lateral surface of the hosing 10, and the first and second coupling holes 15 and 16 may be detents formed in the inner lateral surface of the housing 10 to a preset depth.

The guide hole 14, the first coupling hole 15, and the second coupling hole 16 may be provided as pairs in facing lateral surfaces of the housing 10.

An input unit 19, which is electrically coupled to the controller 70 and to which information for controlling the display apparatus is input by the user, may be provided in an outer surface of the housing 10 but embodiments are not limited thereto. The input unit 19 may include any device which may input signal information for allowing the display 20 to be withdrawn from the housing 10 or allowing the display 20 to be retracted into the housing 10, such as a switch, a keyboard, or a touch screen.

The display 20 may display a variety of information (for example, multimedia data, text data, and the like) to the user, and one end of the display 20 may be mechanically and/or electrically coupled to the first roll 50. For example, the display 20 may be directly coupled to the first roll 50. In another example, the display 20 may be coupled to the first roll 50 through a medium (not shown) which performs signal transfer between the display 20 and the display apparatus.

The other end of the display 20 may be coupled to a grip 21. The grip 21 may be a part which is grasped by the user so as to withdraw the display 20 from the housing 10. The grip 21 may be formed to have substantially the same size and shape as one lateral surface of the housing 10 in which the opening 12 is formed. However, the grip 21 is not limited thereto.

Side protection units (not shown) may be provided on one and/or both sides of the display 20 in a width direction. The side protection units may protect the display 20 from an external impact or wear that may occur to side portions of the display 20. For example, the side protection units may be formed to be thicker than the display 20.

The display 20 may include a liquid crystal display (LCD), a light-emitting diode (LED) display, an organic LED (OLED) display, a microelectromechanical system (MEMS) display or an electronic paper display. The display 20 may be a flexible display in which a display unit is rollable, bendable and/or foldable.

The display 20 may display a variety of content (for example, text, an image, a video, an icon, a symbol, and the like) to the user. The display 20 may include a touch screen, and may receive a touch input, a gesture input, a proximity input, a hovering input, and the like, using an electronic pen or a portion of a body of the user.

In response to the protection member 30 being wound on the first roll 50 and kept together with the display 20, the protection member 30 may be disposed between a top surface 22 and a bottom surface 23 of the display 20 and may prevent the display 20 from being damaged. The protection member 30 may have substantially the same size and/or shape as the display 20. The protection member 30 may include a protection foil formed of a material capable of protecting the display 20. One end of the protection member 30 may be coupled to the first roll 50 and the other end of the protection member 30 may be coupled to the second roll 60.

In response to the display 20 being wound and kept within the housing 10, the protection member 30 may be wound on the first roll 50 and kept together with the display 20. However, in response to the display 20 being withdrawn from the housing 10, the protection member 30 may be separated from the display 20 and the protection member 30 may be wound on the second roll 60 and kept within the housing 10.

For example, in response to the protection member 30 being wound on the first roll 50 together with the display 20, the protection member 30 and the display 20 may be alternately wound on the first roll 50 in such a manner that a top surface 32 of the protection member 30 may face the bottom surface 23 of the display 20, and a bottom surface 33 of the protection member 30 may face the top surface 22 of the display 20. The protection member 30 may be provided so that the bottom surface 33 thereof may be in contact with the top surface 22 of the display 20. Thus, the top surface and the bottom surface of the display 20 are not in direct contact with each other.

The component mounting part 40 may be a part on which components for driving the display apparatus are mounted, and may be disposed between the first roll 50 and the second roll 60. The component mounting part 40 may include the moving shaft 41 formed to protrude from substantially a central portion thereof. The moving shaft 41 may be guided by the guide hole 14 and may move the component mounting part 40 along the X-axis direction.

Figure 4:
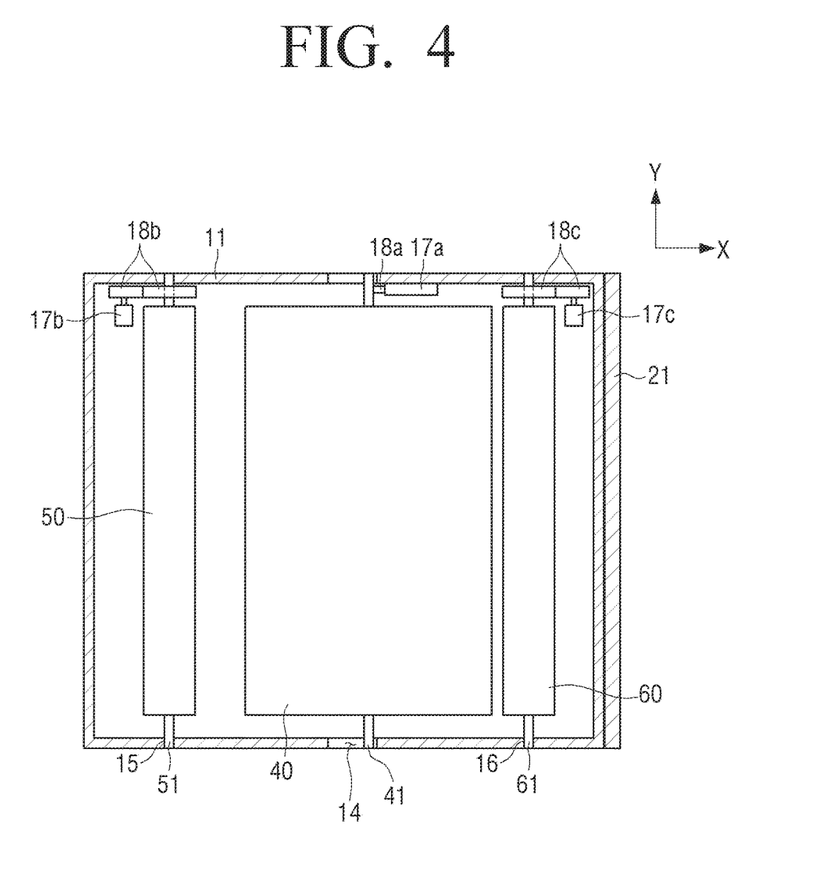
FIG. 4 is a top view illustrating a display apparatus of FIG. 1 from which a display and a protection member are removed according to an embodiment of the present disclosure.

FIG. 4 is a top view illustrating a display apparatus of FIG. 1 from which a display and a protection member are removed according to an embodiment of the present disclosure.

Referring to FIGS. 2 and 4, the movement of the component mounting part 40 may be automatically performed by providing a separate first driving source 17a coupled to the moving shaft 41 through a first power transmission unit 18a, but the movement of the component mounting part 40 may be manually performed by the user. The first driving source 17a may include any one of a micro actuator, a hydraulic cylinder, a solenoid valve, and a motor. The first power transmission unit 18a may transmit power from the first driving source 17a to the moving shaft 41 using various gears, belts, or other devices.

The first roll 50 may be disposed close to one side of the component mounting part 40 and rotatably provided within the housing 10, and the display 20 may be wound on an outer circumference of the first roll 50. The first roll 50 may include the first rotation shaft 51 formed to protrude from substantially a central portion thereof. The first rotation shaft 51 may be rotatably coupled to the first coupling hole 15 to support the first roll 50 and allow the first roll 50 to be rotated within the housing 10.

Referring to FIGS. 2 and 4, the rotation of the first roll 50 may be automatically performed by providing a separate second driving source 17b coupled to the first rotation shaft 51 through a second power transmission unit 18b, but the rotation of the first roll 50 may be manually performed by the user. The second driving source 17b may include any one of a micro actuator, a hydraulic cylinder, a solenoid valve, and a motor. The second power transmission unit 18*b* may transmit rotation force from the second driving source 17*b* to the first rotation shaft 51 using various gears, belts, or other devices.

The second roll 60 may be disposed on the other side of the component mounting part 40 facing the side in which the first roll 50 is disposed, and rotatably provided within the housing 10, and the protection member 30 may be wound on an outer circumference of the second roll 60. The second roll 60 may include the second rotation shaft 61 formed to protrude from substantially a central portion thereof. The second rotation shaft 61 may be rotatably coupled to the second coupling hole 16 to support the second roll 60 and allow the second roll 60 to be rotated within the housing 10.

Referring to FIGS. 2 and 4, the rotation of the second roll 60 may be automatically performed by providing a separate third driving source 17*c* coupled to the second rotation shaft 61 through a third power transmission unit 18*c*, but the rotation of the second roll 60 may be manually performed by the user. The third driving source 17*c* may include any one of a micro actuator, a hydraulic cylinder, a solenoid valve, and a motor. The third power transmission unit 18*c* may transmit rotation force from the third driving source 17*c* to the second rotation shaft 61 using various gears, belts, or other devices.

Referring to FIG. 2, the controller 70 may be electrically coupled to the input unit 19 provided in the outer surface of the housing 10, and may control the first driving source 17*a*, the second driving source 17*b*, and the third driving source 17*c*.

For example, in response to the display 20 being withdrawn from the housing 10 and used by the user, the user may transfer information to the controller 70 through the input unit 19. Accordingly, the controller 70 may control the first driving source 17*a* to move the component mounting part 40 toward the first roll 50, control the second driving source 17*b* to rotate the first roll 50 so that the display 20 and the protection member 30 are unrolled, and control the third driving source 17*c* to rotate the second roll 60 so that the protection member 30 is wound on the second roll 60. In response to the display 20 being retracted into the housing 10 and kept within the housing 10 by the user, the user may transfer information to the controller 70 through the input unit 19. Accordingly, the controller 70 may control the first driving source 17*a* to move the component mounting part 40 toward the second roll 60, control the second driving source 17*b* to rotate the first roll 50 so that the display 20 and the protection member 30 are wound on the first roll 50, and control the third driving source 17*c* to rotate the second roll 60 so that the protection member 30 is unrolled.

An operation of the display apparatus having the above-described configuration according to an embodiment of the present disclosure will be described.

Referring to FIGS. 1 to 4, in response to the display apparatus being unused by the user, the display 20 may be wound on the first roll 50 disposed within the housing 10 and kept within the housing 10. Since the display 20 and the protection member 30 are simultaneously wound on the first roll 50 to protect the display 20, a large space may be necessary in a portion of the housing 10 in which the first roll 50 is disposed. Since the protection member 30 is almost entirely unrolled from the second roll 60, a large space may not be necessary in a portion of the housing 10 in which the second roll 60 is disposed.

In the display apparatus according to an embodiment of the present disclosure, by moving the component mounting part 40 disposed within the housing 10 with respect to the variable spaces necessary for the first roll 50 and the second roll 60, only a minimum overall space is required.

For example, since a large space is sometimes necessary in the periphery of the first roll 50, the component mounting part 40 may move to a direction (a positive direction of the X-axis) away from the first roll 50 along the X-axis. That is, since the protection member 30 is unrolled from the second roll 60 when rolled on the first roll 50, a space in which the component mounting part 40 is to be located may be provided near the second roll 60, and thus the component mounting part 40 may be moved close to the second roll 60.

In such a state, where the display 20 is kept within the housing 10, the moving shaft 41 of the component mounting part 40 may move to be disposed in the right of the guide hole 14 as illustrated in FIG. 3. Accordingly, a space in which the display 20 and the protection 30 are to be wound and kept may be provided in the portion of the housing 10 in which the first roll 50 is disposed.

Figure 5:
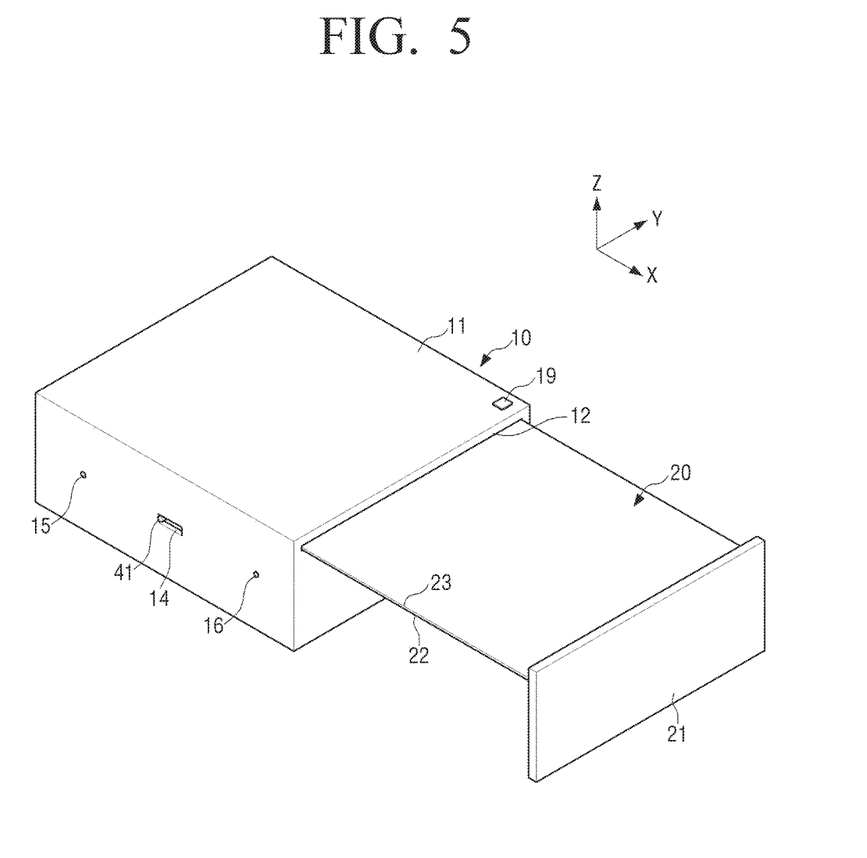
FIG. 5 is a perspective view illustrating a display apparatus of FIG. 1 from which a display is withdrawn according to an embodiment of the present disclosure.

FIG. 5 is a perspective view illustrating a display apparatus of FIG. 1 from which a display is withdrawn according to an embodiment of the present disclosure.

Figure 6:
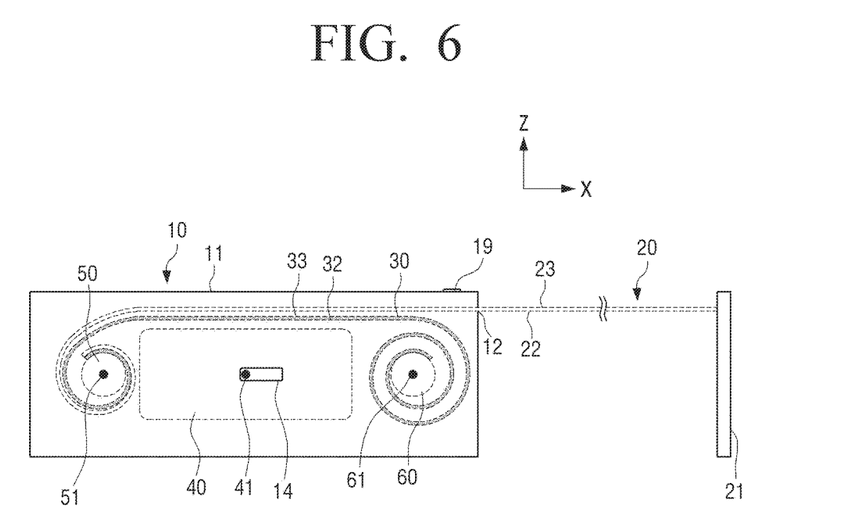
FIG. 6 is a sectional side view illustrating a display apparatus of FIG. 5 according to an embodiment of the present disclosure.

FIG. 6 is a sectional side view illustrating a display apparatus of FIG. 5 according to an embodiment of the present disclosure.

Figure 7:
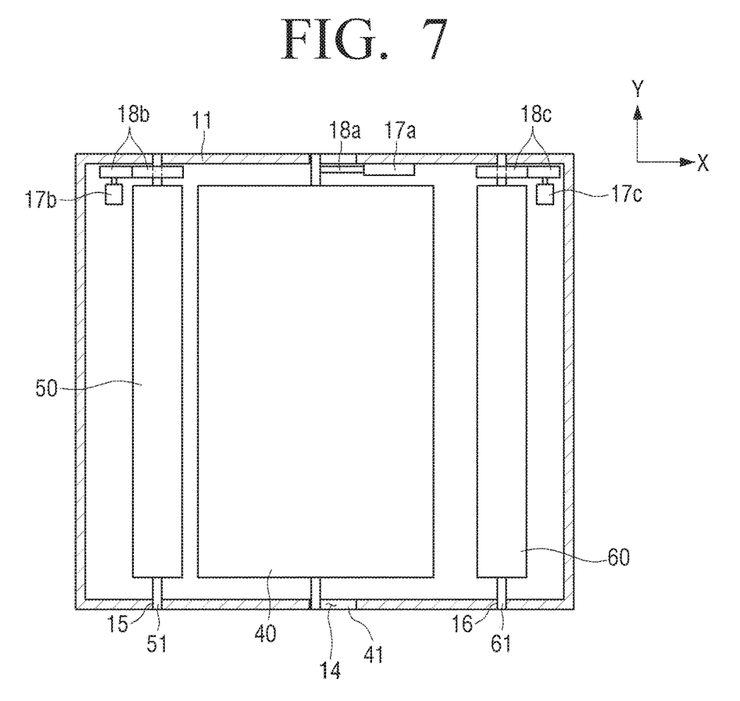
FIG. 7 is a top view illustrating a display apparatus of FIG. 5 from which a display and a protection member are removed according to an embodiment of the present disclosure.

FIG. 7 is a top view illustrating a display apparatus of FIG. 5 from which a display and a protection member are removed according to an embodiment of the present disclosure.

Referring to FIGS. 5 to 7, in response to the display apparatus being used by the user, the display 20 may be withdrawn from the housing 10. The display 20 which has been wound on the first roll 50 may be unrolled and withdrawn from the housing 10, and the protection member 30 which has been wound on the first roll 50 together with the display 20 may be wound on the second roll 60 and kept within the housing 10. That is, a large space may no longer be necessary in the portion of the housing 10 in which the first roll 50 is disposed, and a relatively large space may now be necessary in the portion of the housing 10 in which the second roll 60 is disposed In the display apparatus according to an embodiment of the present disclosure, again by moving the component mounting part 40 within the housing 10 with respect to the variable spaces necessary for the first roll 50 and the second roll 60, only a minimum overall space is required.

For example, since a large space is necessary in the periphery of the second roll 60, the component mounting part 40 may move to a direction (a negative direction of the X-axis) away from the second roll 60 along the X-axis. That is, since the display 20 and the protection member 30 are unrolled from the first roll 50, a space in which the component mounting part 40 is to be located may be provided near the first roll 50, and thus the component mounting part 40 may be moved close to the first roll 50.

In such a state, where the display 20 is withdrawn from the housing 10, the moving shaft 41 of the component mounting part 40 may move to be disposed in the left of the guide hole 14 as illustrated in FIG. 6. Accordingly, a space in which the protection member 30 is to be wound and kept may be provided in the portion of the housing 10 in which the second roll 60 is disposed.

In the display apparatus having the above-described configuration according to an embodiment of the present disclosure, the component mounting part 40 may be provided to be movable within the housing 10 with respect to the positions of the display 20 and the protection member 30, and thus the compact display apparatus with a reduced overall size may be manufactured.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A display apparatus, comprising:
    a housing having an opening;
    a first roll and a second roll rotatably provided within the housing;
    a display configured to be:
        wound on the first roll, and
        retracted into the housing and withdrawn from the housing, through the opening, according to a rotation direction of the first roll;
    a protection member configured to be:
        wound on the first roll together with the display, and
        wound on the second roll; and
    a component mounting part moveably disposed between the first roll and the second roll,
    wherein the component mounting part is configured to move within the housing according to a retraction operation and a withdrawal operation of the display.

2. The display apparatus of claim 1,
    wherein the component mounting part is further configured to move to be spaced from the first roll in response to the display and the protection member being wound on the first roll, and
    wherein the component mounting part is further configured to move to be spaced from the second roll in response to the display being withdrawn from the housing and the protection member being wound on the second roll.

3. The display apparatus of claim 1, further comprising a guide hole configured to guide a movement of the component mounting part, wherein the guide hole is formed in an inner lateral surface of the housing.

4. The display apparatus of claim 1, wherein the component mounting part is further configured to move on a plane parallel to a plane in which the display is withdrawn.

5. The display apparatus of claim 1, wherein the housing further comprises:
    a first driving source configured to move the component mounting part;
    a second driving source configured to rotate the first roll; and
    a third driving source configured to rotate the second roll.

6. The display apparatus of claim 5, further comprising a controller provided in the inside of the housing and configured to:
    receive information through a switch provided in the housing; and
    control the first, second and third driving sources.

7. The display apparatus of claim 1, wherein, in response to the display and the protection member being wound in the first roll, the protection member and the display are alternately wound on the first roll in such a manner that one surface of the protection member faces one surface of the display, and the other surface of the protection member faces the other surface of the display.

8. The display apparatus of claim 1, wherein the protection member has the same shape as the display.

9. The display apparatus as claimed in claim 1,
    wherein the first roll is coupled to one end of the display, and
    wherein a grip is provided at the other end of the display.

10. The display apparatus of claim 1,
    wherein the first roll is coupled to one end of the protection member, and
    wherein the second roll is coupled to the other end of the protection member.

11. The display apparatus of claim 1, wherein the protection member is in contact with a top surface of the display.

12. A display apparatus, comprising:
    a housing having an opening;
    a first roll and a second roll rotatably provided within the housing;
    a display configured to be:
        wound on the first roll, and
        retracted into the housing and withdrawn from the housing through the opening, according to a rotation direction of the first roll;
    a protection member configured to be:
        wound on the first roll together with the display, and
        wound on the second roll; and
    a component mounting part moveably disposed between the first roll and the second roll,
    wherein the component mounting part is configured to alternately move to a space which is provided by unrolling the display and the protection member from the first roll or to a space which is provided by unrolling the protection member from the second roll.

13. The display apparatus of claim 12,
    wherein, in response to the display being withdrawn from the housing, a space in a periphery of the first roll is provided and the component mounting part is further configured to move toward the first roll, and
    wherein, in response to the display being retracted into the housing, a space in a periphery of the second roll is provided and the component mounting part is further configured to move toward the second roll.

14. The display apparatus of claim 12, further comprising a guide hole configured to guide a movement of the component mounting part, wherein the guide hole is formed in an inner lateral surface of the housing.

15. The display apparatus of claim 12, wherein the housing further comprises:
    a first driving source configured to move the component mounting part;
    a second driving source configured to rotate the first roll; and
    a third driving source configured to rotate the second roll,
    wherein the first, second and third driving sources are configured to perform operations preset by a controller provided within the housing.

16. A method to minimize a housing of a retractable display, the method comprising:
    providing a component mounting part moveably disposed within a housing between a first roll and a second roll;
    moving, when space becomes available in the housing around the first roll due to withdrawal of a display rolled on the first roll, the component mounting part toward the first roll; and
    moving, when space becomes available in the housing around the second roll due to removal of a protection member rolled on the second roll, the component mounting part toward the second roll.

17. The method of claim 16, further comprising:
rolling the display and the protection member on the first roll for storage within the housing, such that space becomes available in the housing around the second roll,
wherein the protection member is disposed between layers of the display on the first roll.

18. The method of claim 16, further comprising:
unrolling the display and the protection member from the first roll such that space becomes available in the housing around the first roll;
withdrawing the display from the housing; and
rolling the protection member on the second roll for storage within the housing.

* * * * *